(12) United States Patent
Sioli

(10) Patent No.: US 7,332,063 B2
(45) Date of Patent: Feb. 19, 2008

(54) STRUCTURE FOR AN ELECTROCHEMICAL REACTOR OF THE FILTER-PRESS TYPE

(75) Inventor: Giancarlo Sioli, Cernobbio (IT)

(73) Assignee: Casale Chemicals S.A. (CH)

( * ) Notice: Subject to any disclaimer, the term of this patent is extended or adjusted under 35 U.S.C. 154(b) by 335 days.

(21) Appl. No.: 10/551,061

(22) PCT Filed: Mar. 30, 2004

(86) PCT No.: PCT/EP2004/003342

§ 371 (c)(1),
(2), (4) Date: Sep. 29, 2005

(87) PCT Pub. No.: WO2004/087997

PCT Pub. Date: Oct. 14, 2004

(65) Prior Publication Data

US 2006/0175196 A1    Aug. 10, 2006

(30) Foreign Application Priority Data

Apr. 4, 2003    (EP) ............................ 03007760

(51) Int. Cl.
*C25B 9/20* (2006.01)

(52) U.S. Cl. .............. 204/254; 204/255; 204/256; 204/257

(58) Field of Classification Search ............. 204/254, 204/255, 256, 257, 268
See application file for complete search history.

(56) References Cited

U.S. PATENT DOCUMENTS

| 4,358,357 A | * | 11/1982 | Pere ..................... 204/256 |
| 4,758,322 A | * | 7/1988 | Sioli ..................... 204/255 |
| 5,429,643 A | | 7/1995 | Lund et al. |
| 5,833,821 A | | 11/1998 | Schmid et al. |
| 5,919,344 A | | 7/1999 | D'Erasmo et al. |
| 6,878,244 B2 | * | 4/2005 | Sioli ..................... 204/258 |
| 2003/0027031 A1 | | 2/2003 | Baldauf et al. |

FOREIGN PATENT DOCUMENTS

| EP | 0 995 818 A1 | 4/2000 |
| EP | 1 396 558 A1 | 3/2004 |
| FR | 2 410 059 A | 6/1979 |

* cited by examiner

*Primary Examiner*—Bruce F. Bell
(74) *Attorney, Agent, or Firm*—Akerman Senterfitt

(57) ABSTRACT

A structural component for electrolytic cells of an electrochemical reactor of the filter-press type, comprising a frame (6) supporting its corresponding functional element (7, 7*a*), a bipolar sheet or a diaphragm, respectively.

4 Claims, 3 Drawing Sheets

STRUCTURE FOR AN ELECTROCHEMICAL REACTOR OF THE FILTER-PRESS TYPE

FIELD OF APPLICATION

The present invention refers, in its most general aspect, to the structure of an electrochemical reactor of the so-called filter-press type, operating at medium or high pressure.

A reactor of this type comprises a plurality of electrolytic cells, associated essentially in the form of a pack, comprised between end sealing elements suitably tensioned.

Each electrolytic cell comprises two so-called bipolar components, fixed onto a component so-called separator, placed in-between.

Said components, bipolar components and separator, comprise, in turn, a supporting frame of a corresponding functional element.

The above-mentioned components, bipolar components and separator, will be referred to in the description below and in the subsequent claims, also as structural and functional components of the electrolytic cells of the electrochemical reactor.

More specifically, the present invention refers to a frame which may be used to create said structural and functional components of electrolytic cells of the abovr mentioned type.

PRIOR ART

Electrochemical reactors of the so-called filter-press type are used for various electrochemical processes: for example, for the electrolysis of water, for the electrolysis of chlorides in the production of chlorine, alkaline hypochlorites, chlorates, and for the electrodialysis of saline solutions.

In addition, recent new areas of interest for this type of reactor have included applications in the field of flow batteries and fuel cells.

It is moreover known that some electrolysis processes can be advantageously carried out under pressure, for an increase in the efficiency of the process, for a reduction of the volume of the gases produced, and also for the reduction of the moisture content of the reaction products.

Fuel cells, likewise, have their efficiency increased when operate at high pressures.

The possibility to operate under high pressures in electrochemical reactors of the said type goes however against their limited mechanical resistance, which is mainly entrusted to the frames of the structural and functional components of the single cells that form the reactor.

To confer to the electrolytic cells, and thus to an electrochemical reactor, a good resistance to internal pressure as well as an equally good resistance to acid corrosion, international patent Application WO 0022191 describes electrolytic cells associated in the form of a pack and having electrically-insulating frames coupled, substantially with a joint.

For this purpose, these frames have projections and indentations arranged in such a way that a projection of one frame is engaged by an indentation of an adjoining frame, thus forming essentially a single body.

Such a solution, however satisfactory from various points of view, is not without its drawbacks: in order to withstand high internal pressures, besides said coupling with a joint, said frames must be realized with big thickness, and this considerably reduces the benefit achieved, especially for industrial applications that require electrochemical reactors with great dimensions and potentiality.

SUMMARY OF THE INVENTION

The technical problem underlying the present invention is that of providing a structural and functional component for the electrolytic cells of an electrochemical reactor of the filter-press type, operating at medium or high pressure, having a frame whose characteristics enable it to overcome the mentioned drawbacks, i.e. one that guarantees a high degree of resistance to the pressure within the electrochemical reactor and a decidedly lesser thickness than that taught by the prior art, while still keeping a high degree of resistance to corrosion by chemical agents.

The above-mentioned problem is solved in the present invention by means of a structural and functional component of the type here considered, comprising a frame and characterized in that said frame comprises a first annular frame and a second annular frame, the two being structurally independent from each other and coupled together, coaxially, one inside the other.

Further features and the advantages of an electrochemical reactor according to the invention will become clearer from the following description of an indicative and non-limiting example of embodiment thereof, made with reference to the attached drawings.

DETAILED DESCRIPTION

Figure 1:
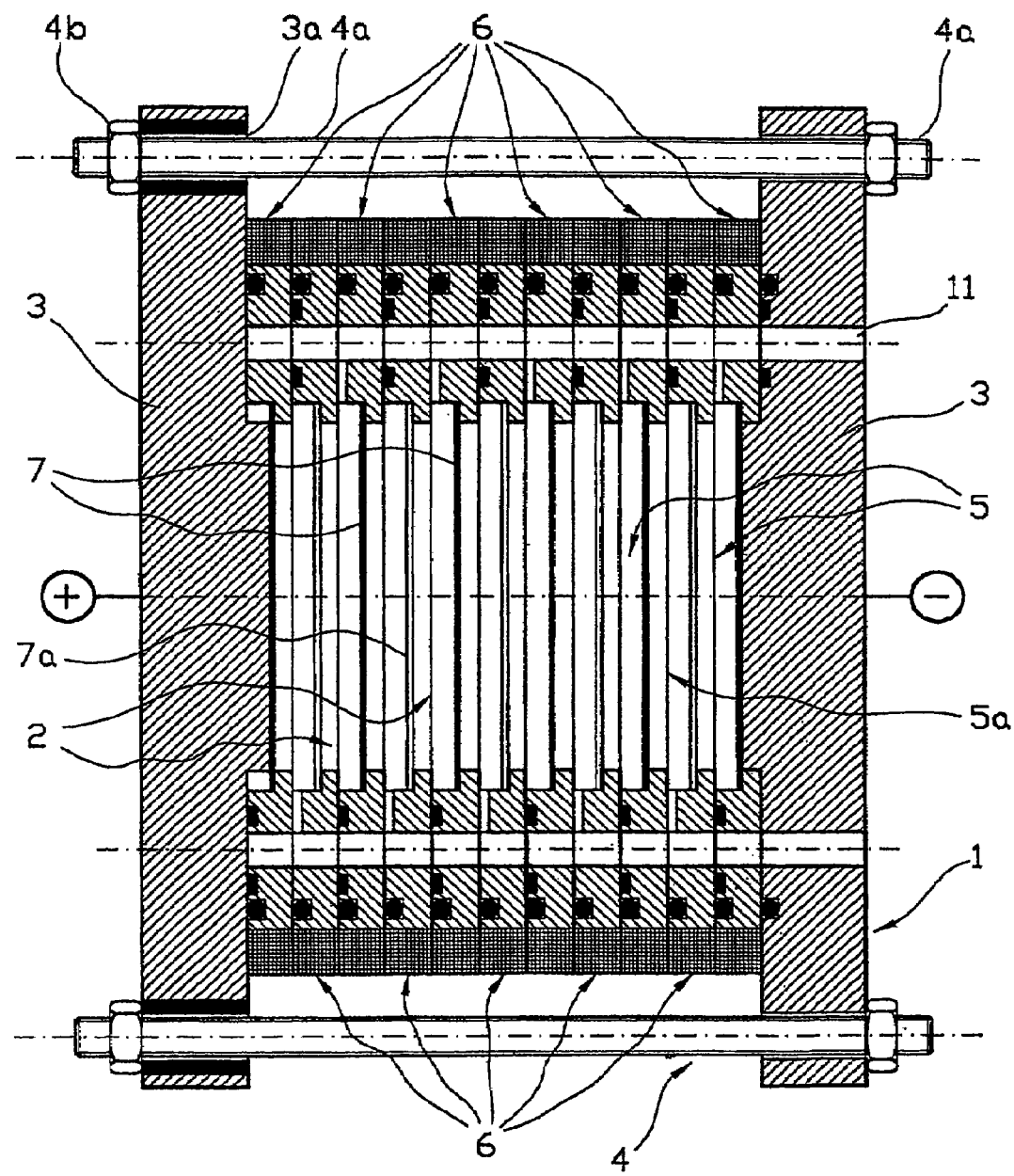
FIG. 1 is a diagram view, in axial cross-section, of an electrochemical reactor of the filter-press type according to the present invention.
Figures 2, 3:
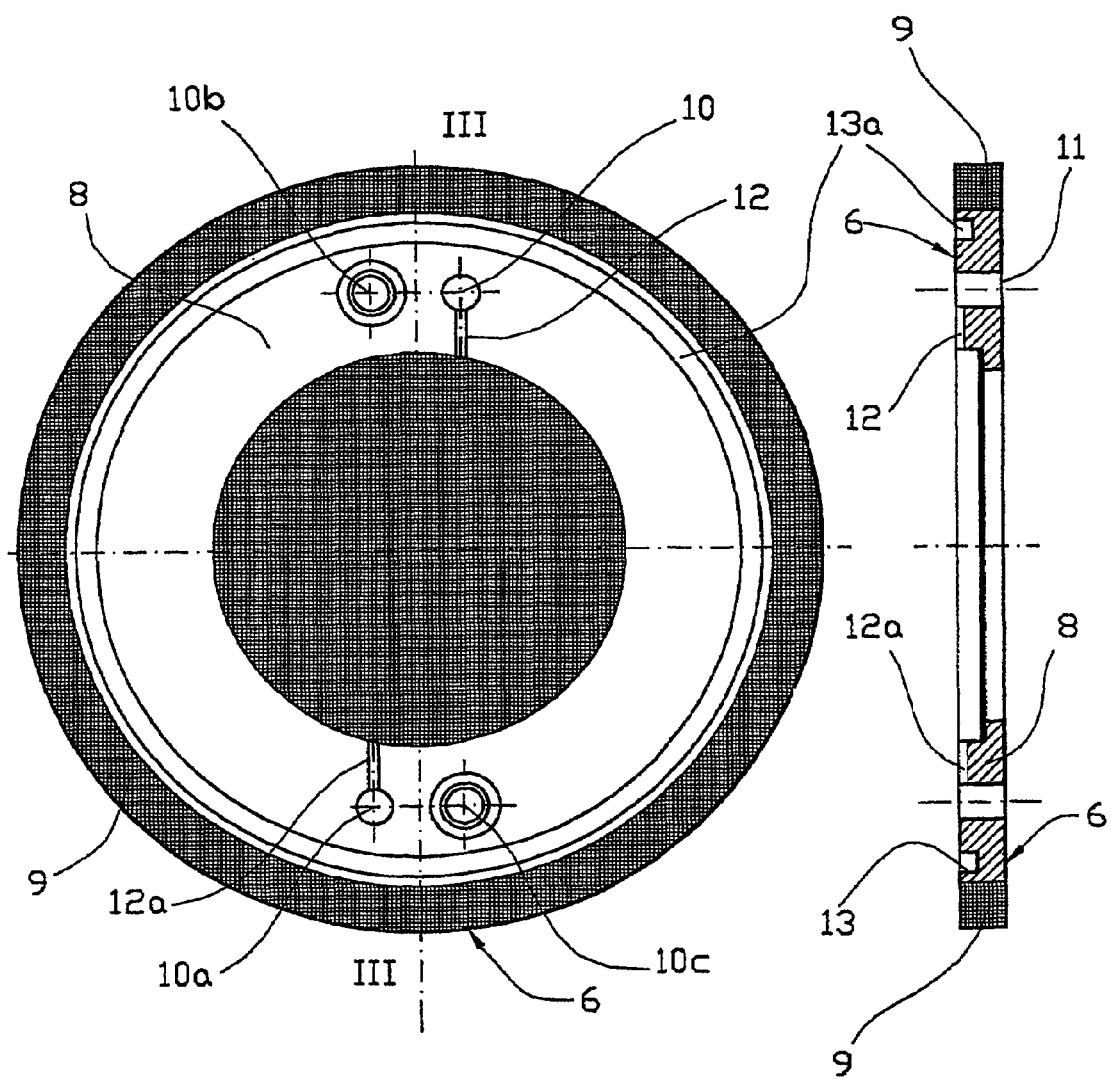
FIG. 2 shows, schematically and on an enlarged scale, a frontal view of one structural and functional component of the electrochemical reactor shown in FIG. 1.
FIG. 3 shows a diagrammatic cross-section view, along the line III-III, of the structural and functional component shown in FIG. 2.
Figure 4:
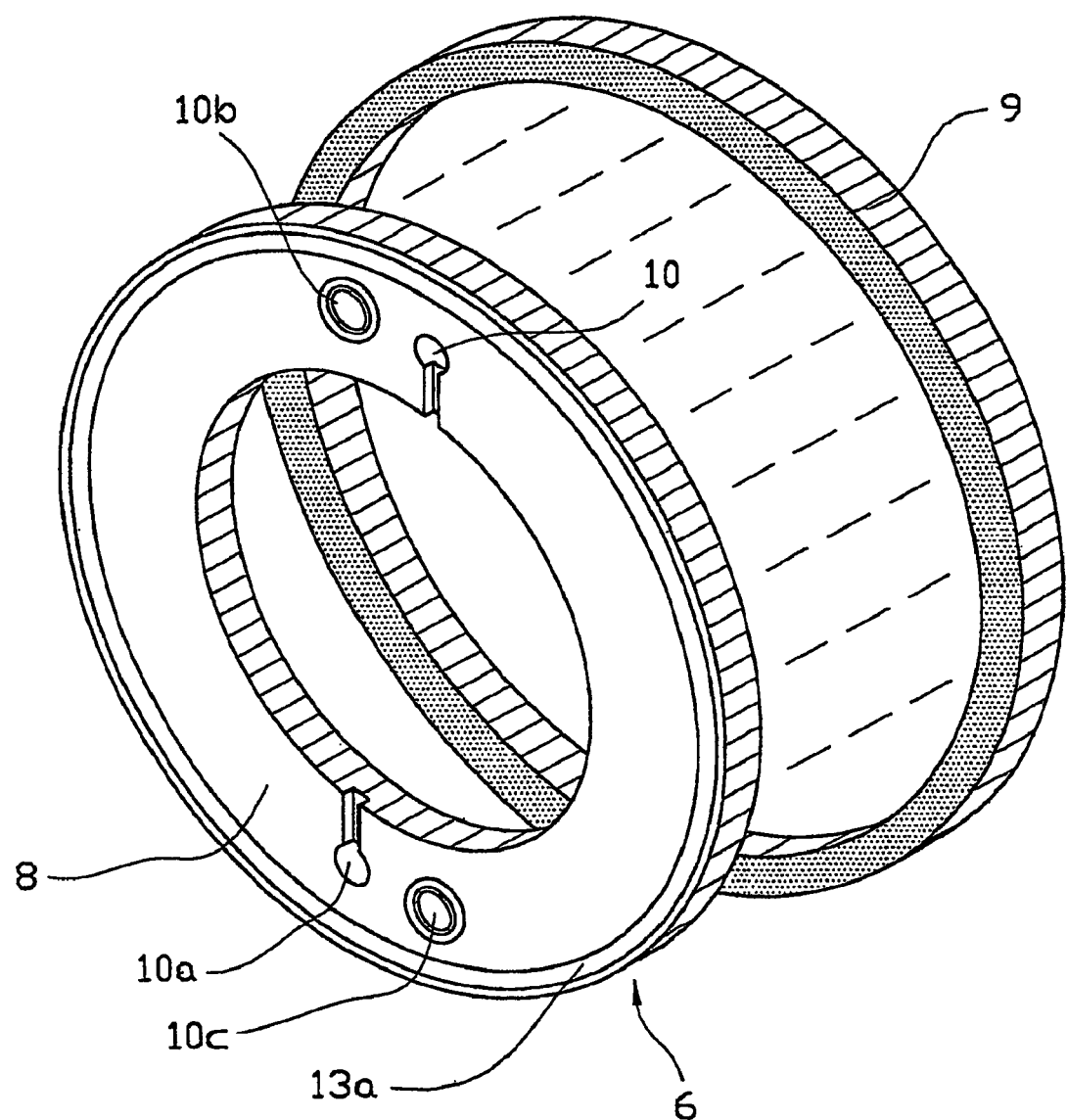
FIG. 4 is a diagram view of the separate parts of a detail of the structural and functional component of FIG. 2.

Referring to the above-mentioned figures, 1 is an overall schematic representation of an electrochemical reactor of the filter-press type, realized according to the present invention.

The reactor 1 comprises essentially a plurality of electrolytic cells 2, associated in the form of a pack and comprised between end sealing elements 3.

Said end sealing elements 3 are suitably tensioned with each other by means of tie rods 4.

The tie rods 4 are rods 4a, which pass through holes 3a in the end sealing elements 3 and are secured to these end seals 3 by means of retaining nuts 4b.

Each electrolytic cell 2 comprises two so-called bipolar components 5, tightened on a so called separator component 5a, comprised between them.

In turn, these bipolar 5 and separator 5a components each comprise a frame 6 supporting a corresponding functional element 7, 7a, in particular a bipolar sheet and respectively a diaphragm.

According to the present invention, each frame 6 comprises a first annular frame 8 and a second annular frame 9, structurally independent of each other and coupled together, coaxially, one inside the other.

Each annular frame 8 has holes 10, 10a, 10b, 10c in corresponding positions.

Said holes 10, 10a, 10b, 10c, in the packed layout of the electrolytic cells 2, are aligned in such a way as to form conduits 11 for the passage of the operating fluid taking part in the electrochemical process that it is intended to be realized in the reactor 1.

Furthermore, holes 10 and 10a of each annular frame 8 are in fluid communication with the inside of each electrolytic cell 2, through channels 12, 12a hollowed out on one side only of said annular frame 8, that, in said layout, form passages for the supply of the operating fluid to the individual electrolytic cells 2, or a return path for the recovery of that fluid.

Each annular frame 8 also has a recess 13 to accommodate a corresponding gasket 13a impermeable to the operating fluid inside the reactor so as to form a seal with perfect tightness for the plurality of electrolytic cells 2.

Advantageously each annular frame 8 is made with a material which mainly withstands corrosion by chemical agents.

Specifically, the annular frame 8 is made in thermoplastic or thermosetting polymer material, through injection polymerization or pressure-molding, or die-forming of the plastic material.

Said plastic material could contain fibers or reinforcement fillers and similar additives.

Each annular frame 9 of every frame 6 is advantageously made of material which mainly withstands high pressures.

In particular the annular frame 9 is made of composite material.

Preferably said composite material is produced by winding filaments of fiberglass, filaments of aramid fiber or filaments of carbon fiber onto a core coated with a releasing agent, wherein said filaments are impregnated with a thermosetting resin, such as an epoxy resin containing a hardener, or with a phenolic resin, a polyester/vinyl ester resin, or a furan resin.

The winding of the filaments onto the core is conveniently controlled by means of known electronic devices for monitoring so as to regulate the tension, the speed of winding, the spacing and thickness of the filaments being wound onto the core.

In an embodiment, with a core diameter of 419.2 mm, a 428 mm external diameter annular frame 9 is obtained in the case of a frame made of fiberglass filaments, an external diameter of 427 mm using filaments of aramid fiber, and an external diameter of 426 mm using carbon fiber filaments.

With the use of frames designed as described above it has made possible to the reactor according to the present invention to operate at internal working pressures of up to 200 bar, preferably at internal pressures of the order of 50 bar.

According to a preferred embodiment, the annular frame 9 obtained as above is then fitted, i.e. gently forced, onto the annular frame 8 so as to form the above-mentioned frame 6, essentially in the form of a single block.

The main advantage of the electrochemical reactor according to the present invention is that, being said frames formed in two structurally independent annular frames, it is possible to make these frames in two different materials; in particular, it becomes possible to use a material with high mechanical resistance to realize one of these frames, thus obtaining considerably thinner frames with the same reactor working pressure, with respect to the teachings of prior art.

A further advantage of the electrochemical reactor according to the present invention is that, thanks to the independent structure of the two annular frames of a said frame, they are simpler to produce, and so of certain industrial interest.

In an alternative embodiment of the invention, the coupling of the above mentioned annular frames can be designed to be removable, for example by using glue, so as to advantageously, if necessary, replace only one of these annular frames composing the frame, thus extending the working life of the reactor.

Obviously, a man skilled in the art can make any of a number of changes to the invention described above, for the purpose of meeting the particular requirements of an individual case, all falling with the scope of protection of the invention as defined by the following claims.

The invention claimed is:

1. Structural component for electrolytic cells of an electrochemical reactor of the filter-press type, comprising of a frame supporting its corresponding functional element chosen between a bipolar sheet and respectively a diaphragm, characterized in that said frame comprises a first annular frame and a second annular frame, the two being structurally independent of each other and coupled together, coaxially, one inside the other, said first annular frame and said second annular frame being made of different materials, the material of said first annular frame being mainly resistant to corrosion by chemical agents, the material of said second annular frame being made of composite material mainly resistant to the high working pressures of said reactor.

2. Structural component according to claim 1, wherein said first annular frame has holes and channels adapted to provide, in a packed layout, passages for an operating fluid inside said electrochemical reactor.

3. Structural component according to claim 1, wherein said first annular frame is made of thermoplastic or thermosetting polymer material.

4. Structural component according to claim 3, wherein said polymer material contains reinforcement fillers and/or additives.

* * * * *